United States Patent [19]
Nowell et al.

[11] Patent Number: 5,765,859
[45] Date of Patent: Jun. 16, 1998

[54] MODULAR SQUATDOWN WHEELED SUSPENSION SYSTEM

[76] Inventors: Corbett Weldon Nowell, 341 S. Beverly St., Porterville, Calif. 93257; Charles Plumer Nowell, 1302 Adams St., Salinas, Calif. 93906; Freddie Albert Tomlinson, 1562 Kern St., Tulare, Calif. 93274

[21] Appl. No.: 698,333

[22] Filed: Aug. 15, 1996

Related U.S. Application Data

[63] Continuation of Ser. No. 197,452, Feb. 16, 1994, Pat. No. 5,560,639, which is a continuation of Ser. No. 803,545, Dec. 9, 1991, abandoned.

[51] Int. Cl.$^6$ .................................................. B60G 11/26
[52] U.S. Cl. .................................. 280/704; 280/43.17
[58] Field of Search .............................. 280/704, 43.17, 280/848, 6.12, 715, 656; 414/495; 180/276, 24.02

[56] References Cited

U.S. PATENT DOCUMENTS

| | | |
|---|---|---|
| 2,462,868 | 3/1949 | Ives. |
| 2,487,325 | 11/1949 | Foster. |
| 2,784,978 | 3/1957 | Seale. |
| 2,957,593 | 10/1960 | Evans. |
| 3,064,994 | 11/1962 | Limmer ........................ 280/704 |
| 3,113,686 | 12/1963 | Sundin. |
| 3,633,775 | 1/1972 | Pugliese. |
| 4,058,325 | 11/1977 | Schramm. |
| 4,260,317 | 4/1981 | Martin et al. ...................... 280/656 |
| 4,434,998 | 3/1984 | Kaltwasser. |
| 4,568,235 | 2/1986 | Bills, Jr.. |
| 4,619,578 | 10/1986 | Routledge. |
| 4,673,328 | 6/1987 | Shiels. |
| 4,752,177 | 6/1988 | Zenna. |
| 4,915,577 | 4/1990 | Fraser. |
| 5,354,090 | 10/1994 | Grovom ............................ 280/656 |

*Primary Examiner*—Eric D. Culbreth
*Attorney, Agent, or Firm*—Sixbey, Friedman, Leedom & Ferguson, P.C.; Joan K. Lawrence; Jeffrey L. Costellia

[57] ABSTRACT

A modular wheeled suspension system which may be actuated to move a cargo holding deck or vehicle frame between a ground engaging load position to facilitate the loading of cargo and a transport position out of contact with the ground is provided. An adjustable telescoping frame for the cargo holding deck is further provided to accommodate loads of different sizes. The suspension system employs an arrangement of air bags supported between pivoted bracket elements located adjacent to the vehicle wheels and an air supply system with an automatic locking arrangement to allow the deck or frame to be lowered to a ground engaging load position and maintained in the load position until loading has been completed and the frame or deck raised to the transport position.

16 Claims, 6 Drawing Sheets

MODULAR SQUATDOWN WHEELED SUSPENSION SYSTEM

This is a continuation of Ser. No. 08/197,452, filed Feb. 16, 1994, now U.S. Pat. No. 5,560,639, which is a continuation of Ser. No. 07/803,545, filed Dec. 9, 1991, now abandoned.

The present invention relates, in its broader sense, to suspension systems, and more particularly to such a system primarily for use at the rear axle of trucks and trailers, wherein it is advantageous to be able to lower the rearward portion of the deck of the truck or trailer to ground level to accept a load.

BACKGROUND OF THE INVENTION

1. Field of Invention

Since the advent of horse drawn wagons, such vehicles have been used to transport cargo too bulky or too heavy to be carried by hand, wheel barrows or the like.

If the cargo to be transported was too heavy and it could not be hoisted to the bed of the wagon, the options were to use a ramp, or the wagon could be backed up to an elevated platform, known in more modern day parlance as a loading dock.

When wagons got motors and became trucks, they were faster and more efficient, but loading and unloading cargo remained a problem.

Probably the next step in the evolution of the process of heavy cargo on and off loading, is the venerable fork lift. However, fork lifts can be dangerous and cumbersome in limited space and, of course, availability is a perpetual problem. A better system was needed.

Since loading docks and fork lifts are not always available where needed, the lift gate was developed and mounted to the rear of the transport vehicle so that cargo could be loaded or unloaded no matter where the vehicle was located. However, lift gates are limited in size and capacity and, therefore, limited as to their usefulness.

The present invention seeks to obviate the several problems inherent in the loading and unloading of cargo through the ingenious process of bringing the vehicle to the cargo, rather than the cargo to the vehicle, as will become more clear hereinafter.

2. Description of Prior Art

Previous paragraphs track a part of the evolution in loading and unloading practices which constitute, for the most part, the significant prior art. Nonetheless, the search continues to find a safe and efficient means of loading and unloading heavy, and/or bulky cargo, and it is generally accepted that the safest and most efficient way of accomplishing the desired result is not to have to lift or elevate the cargo onto the bed of the vehicle.

With this in mind, innovators such as Ives and Foster conceived the idea of tilting the bed of the vehicle, and they obtained U.S. Pat. Nos. 2,462,868 and 2,487,325, respectively, as a reward for their efforts.

In the '50's, air bags became the subject of considerable research and development, although primarily as a substitute for, or adjunct with, steel springs in a vehicle suspension. Seale, in his U.S. Pat. No. 2,784,978, envisioned the possibility of using air bags to level loads, or otherwise compensate for uneven load distribution.

In the early '70's, Pulgliese, in his U.S. Pat. 3,633,775, recognized the potential of air bags in lowering one end of the bed of a truck to make it easier to load cargo thereon, and Evans offered a variation on that theme by patenting his boat trailer (U.S. Pat. No. 2,957,593). These early efforts, however, were directed toward solving highly specialized problems and do not address the needs of the over the road cargo hauling industry . . . enter the present invention.

The cargo transportation industry, from recreational to industrial use, has been supplied by the motor vehicle manufacturing companies and trailer manufacturing companies with suspensions that attempt to hold the "bed" at a calibrated height up to the maximum weight capacities.

Originally, leaf-type springs were utilized to "soften" the ride; however, with little or no cargo the ride was quite jolting. Thereafter, inventors created several types of suspensions to create a softer ride by including a coil spring, and/or "shock absorber", air assisted "shocks", torsion bar suspension, air bag suspension system with a leveling valve. All of these "systems" were designed to "carry" the load, with some attempted driver and passenger comfort.

Another dilemma the transportation industry faced was the loading and unloading of cargo. At warehouses and large stores, "docks" were built to the height of the "bed" for easy removal and loading of box cars, trucks, and trailers. This was fine if the final destination was at another "dock", but generally the final destination was ground level and various inventions, such as the hydraulic tailgate, a tailgate made in such a fashion as to become horizontal then lower hydraulically to ground level with or without a load and then return. This had to be operated with at least one hand while the other hand had to balance the load. It had the potential of being very hazardous and time-consuming.

Another was a "bed" that could be hydraulically moved in such a way as to have a loading angle of 9 degrees to 20 degrees. Again, the problem was loading and unloading without damage to the cargo and immobilizing the cargo (tying down, securing). Another method was where the "bed" was hydraulically unloaded from the frame of the "chassis".

All of these methods had problems, such as inefficiency in time management, potential hazards to the operator in loading or unloading, and because of heavy suspension needed for the load when the vehicle was empty, the ride became harder and caused back injuries to the operator. Bigger or higher vehicles had to be made to handle the heavier loads and getting up and down from these vehicles made knees wear out before their time. Falling accidents also occurred more frequently.

Low-height "beds" were more efficient but ramps still had to be used and more space was required. Livestock balked at going up any type of ramp. Heavy springs caused laws to be passed in most states requiring the exercising of race horses every three to four hours of traveling because of possible hazards to their knee joints.

Bed heights 40", and higher are dangerous because of the high center of gravity causing "tip overs" and "jack-knifing". Wind resistance is greater making it less economical.

The conventional "slide back" car carrier has become obsolete because of its high load angle. Auto manufacturers are "lowering" their cars, making them more aerodynamic, more efficient, etc. Tow trucks with wheel lift capabilities are also not able to retrieve economically the new four wheel drive and four wheel steering cars.

All the previous cargo vehicle designs heretofore known suffer from a variety of disadvantages, among them:

1. They are not for operator and/or passenger comfort and safety.

2. Fixed "bed" height, such that awkward and dangerous loading and unloading procedures are required.

3. Higher center of gravity subject to "tip over", "jack-knifing", etc.

4. Dock and ground level loading and unloading problems.

5. Roll back—slide back type car carriers have excessive load angles.

6. Excessive time required to prepare for loading or unloading and securing load.

SUMMARY OF THE INVENTION

The present invention provides an affordable alternative to the plethora of problems faced, on a daily basis, by those who, of necessity, or as part of their work, have need to transport cargo overland. Use of the present invention obviates loading docks, ramps and power tail gates, and the user knows that no matter what his destination, he can and will be unconcerned about the availability of any particular equipment for unloading cargo, since his vehicle will, when equipped with the system of the present invention, simply sit or squat down to permit unloading of the vehicle in complete safety, and with a minimum of effort.

Accordingly, several objectives are accomplished, and advantages achieved in the practice of the invention, among them, the following:

The provision of a modular combined wheel and suspension system, capable of original equipment or aftermarket installation, which will transform an otherwise cumbersome vehicle into a safe and useful device for transporting cargo overland to and from any location, without regard to the need for loading docks, ramps or power equipment for loading and unloading.

Similarly, the present invention provides a novel suspension system having all of the features attributed to it, while at the same time being capable of a stable, secure and comfortable ride, whether loaded or unloaded.

The foregoing, as well as several other features and advantages, will become apparent from the following detailed description of a preferred embodiment, read in conjunction with the drawings, wherein:

DESCRIPTION OF A PREFERRED EMBODIMENT

Figure 1:
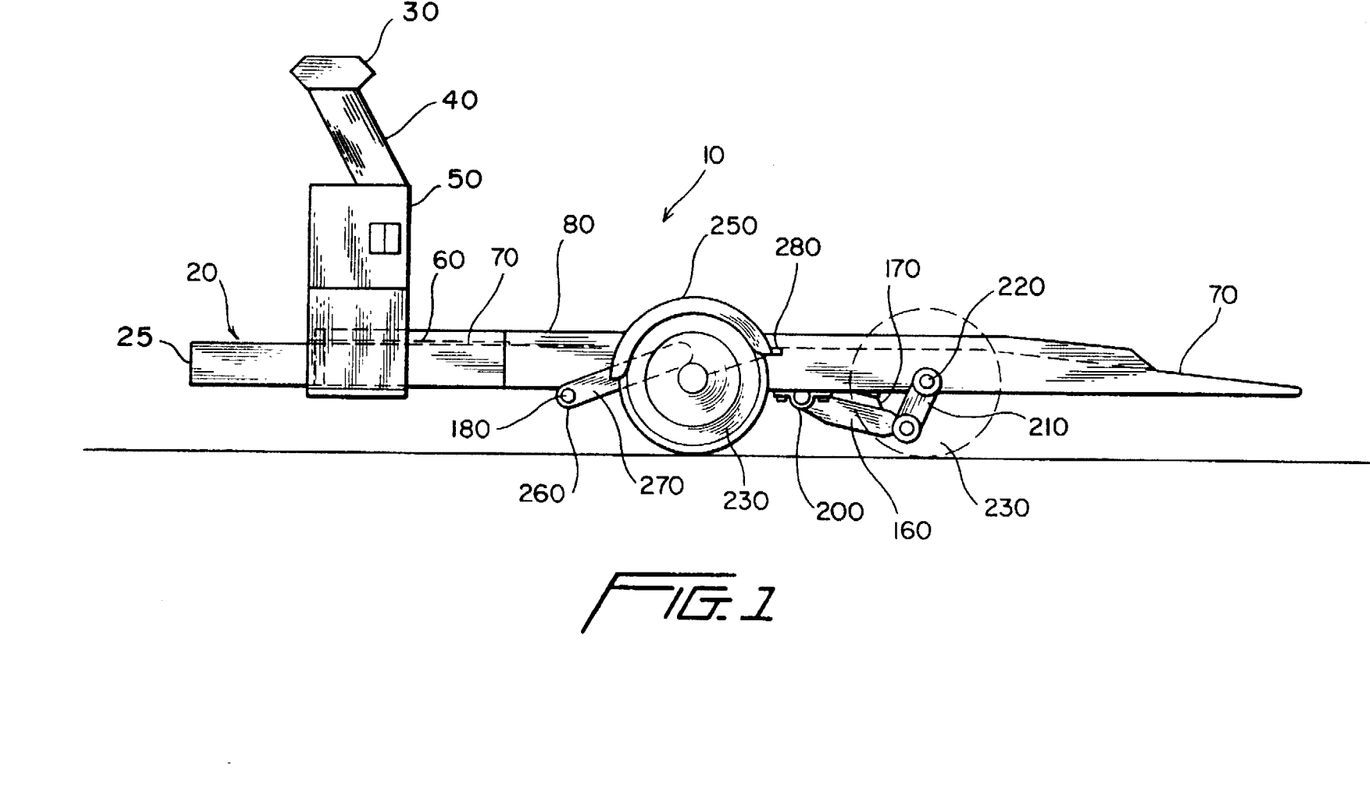
FIG. 1 is a pictorial representation of a flat bed trailer equipped with a plurality of modular suspension units constructed in accordance with the present invention and depicted in its transport mode.
Figures 6, 8:
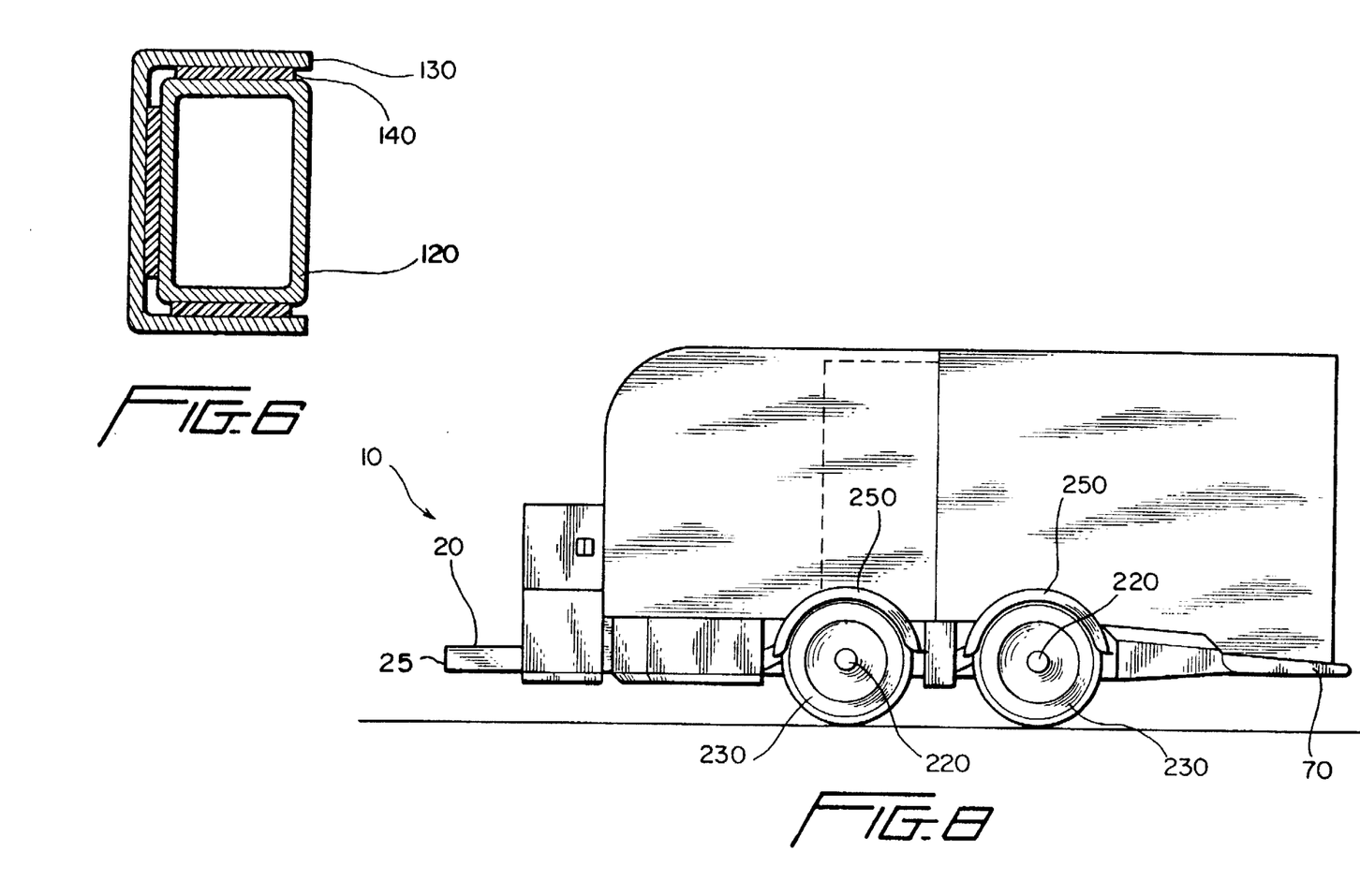
FIG. 6 is a sectional view of the frame rail of a vehicle constructed in accordance with the present invention.
FIG. 8 is illustrative of an enclosed vehicle as an alterative to the vehicle of FIG. 1.

With reference now to the drawings, and initially to FIG. 1, a vehicle 10 constructed in accordance with the present invention is illustrated in one of its several configurations. More specifically, the FIG. 1 configuration is a towable flatbed trailer device. As will be apparent from the following description, the several novel facets of the present invention are no less applicable to a flatbed truck, or a covered truck or trailer, such as seen in FIG. 8.

The vehicle of the present invention necessarily includes a main frame 20, which may be towable, or an integral part of a powered vehicle.

Figure 3:
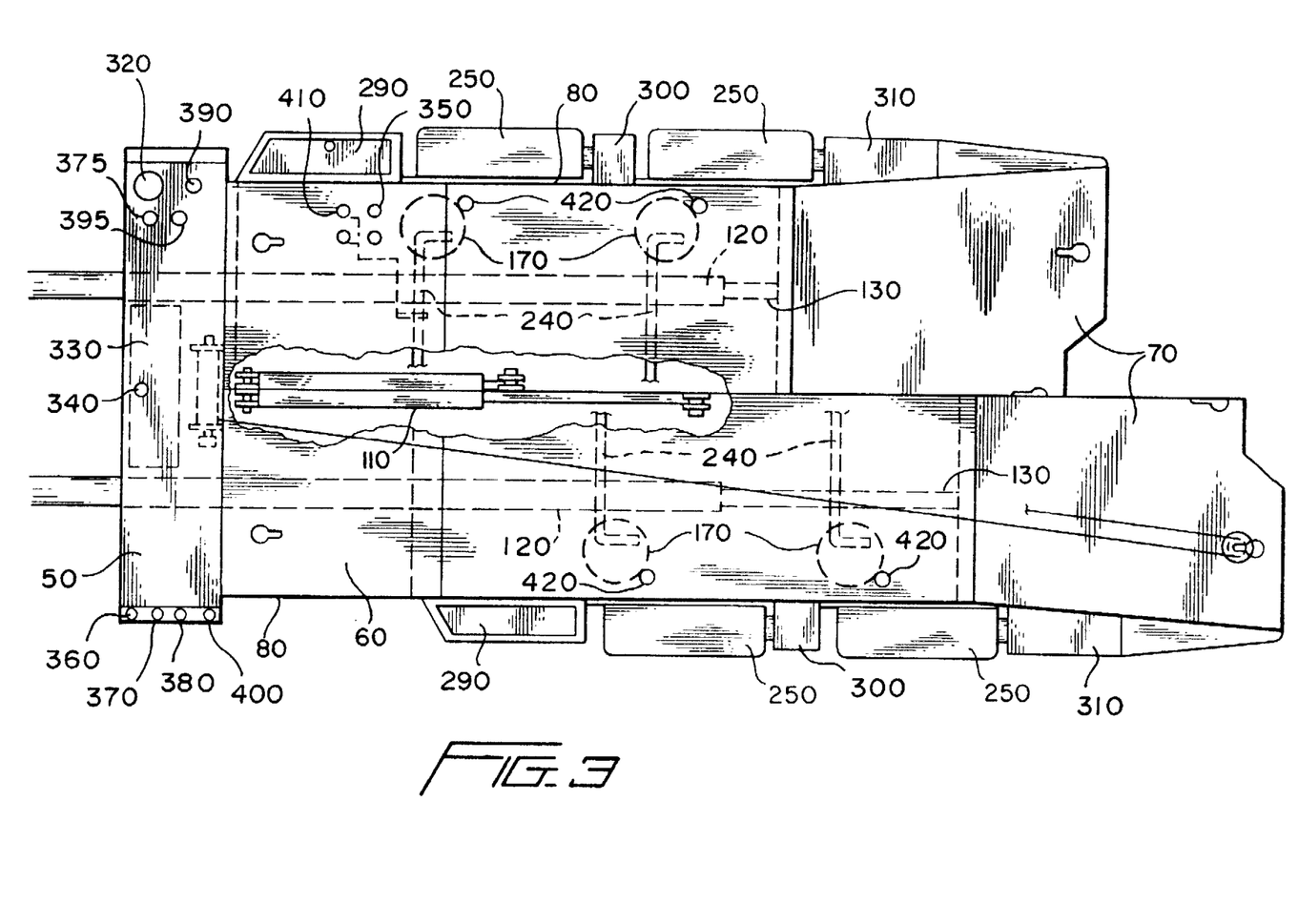
FIG. 3 is an overhead plan view, partially sectioned, of a vehicle such as shown in FIG. 1, illustrating certain other features of the invention.
Figure 4:
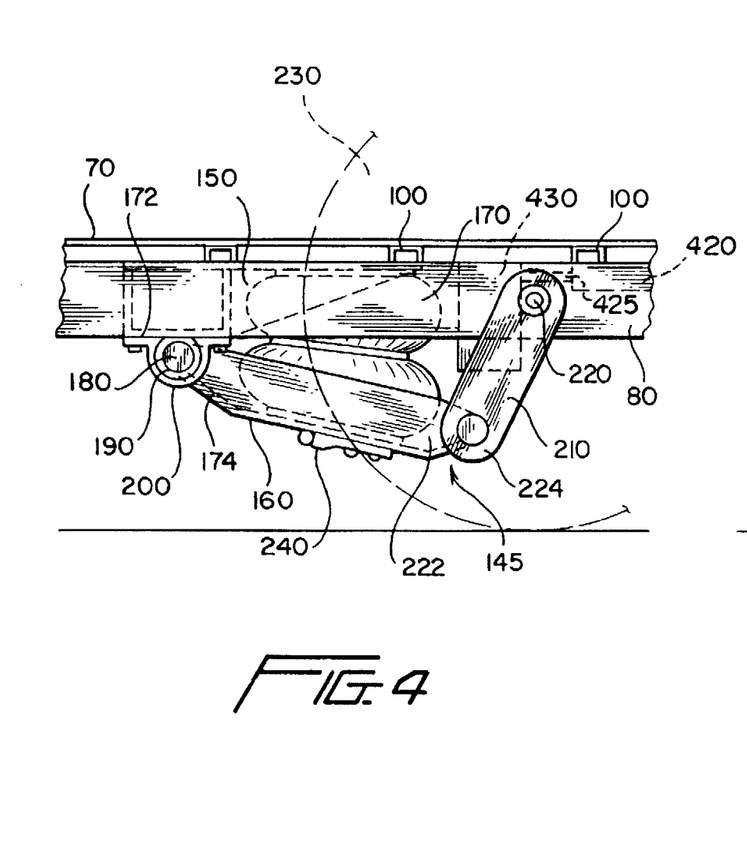
FIG. 4 is a side elevation of a portion of the vehicle of FIG. 1, illustrating the interrelationship of certain parts of the suspension system of the present invention.
Figure 5:
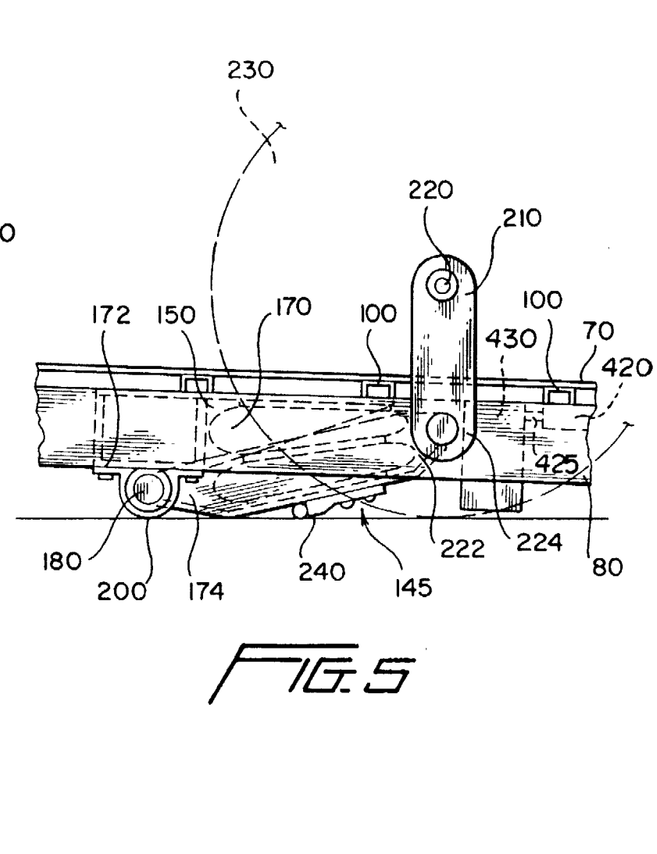
FIG. 5 is a depiction of FIG. 4 with the suspension system in the "squatdown" mode.

The main frame assembly 20, which defines the load carrying area of the vehicle, includes, as illustrated, a sliding deck 60 which slides on a telescoping deck 70. The sliding deck 60 is attached to a cab protector or tool box 50, as described in detail below, to cover the gap (not shown) caused by the telescoping of the deck 70. It is also braced to be used as a deck upon which cargo to be hauled may be loaded and secured in any number of well known ways. The structural integrity of the telescoping bed of the truck is assured by providing structural cross members, such as deck support cross members 100 (FIGS. 4 and 5). The main frame members may be constructed in a variety of ways without departure from the invention, although it has been found that the structure depicted in FIG. 6 is particularly effective. In reference to FIG. 6, the main frame assembly 20 is shown in cross section, as comprising a high tensile strength, generally rectangular, member 120, partially surrounded by a C-shaped telescoping subframe 130 powered by a hydraulic cylinder 110 (FIG. 3). The inside surface of the "C" adjacent to the main frame member 120 has a "high tech" plastic 140 bonded to it to provide a smooth, maintenance-free surface to prevent a metal-to-metal contact. For example, a five inch "C" channel frame can enclose the top, bottom and outside sides of a four inch "C" channel that was enclosed or boxed in for more strength. Both "C" channels can be made of high tensile steel with at least a 60,000 pound per square inch strength. A tough high tech plastic is used in between the channels for spacing, for a slippery no-maintenance rub surface, and for no metal-to-metal contact.

Perhaps the single most compelling feature of the present invention is the provision of a unitized wheel and suspension system, illustrated in some detail in FIGS. 4 and 5, and referred to herein as a modular, independent wheel, air bag suspension system 145, also sometimes referred to herein, for sake of brevity, as the modular unit.

As is evident from the drawings, and in keeping with the objectives of the invention, each modular unit 145 employs air bags 170. As shown schematically in FIG. 3, four modular units 145 of the kind shown in FIG. 7 may be attached to the vehicle in tandem and parallel alignment to each other. In order to support the air bag arrangement, the modular unit 145 includes an upper air bag bracket 150, and a lower air bag bracket 160, disposed beneath, and in face to face relation with the upper bracket 150.

Figure 7:
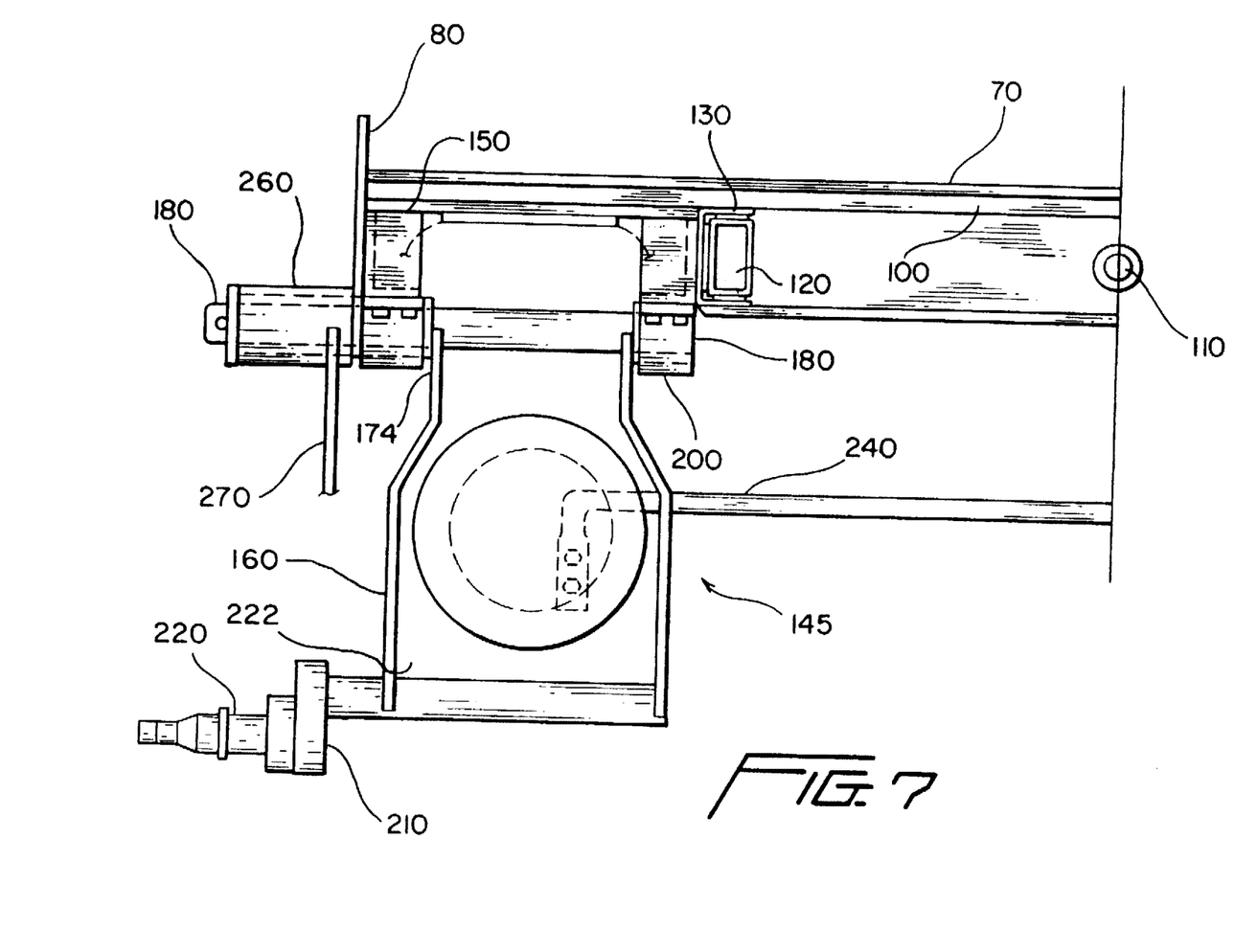
FIG. 7 is a plan view of a portion of the suspension system of the present invention, with the air bag removed to show the lower bracket in relation to the spindle.

As may be best seen in FIGS. 4 and 7, the upper bracket 150 is attached underneath the telescoping deck 70 and between a main frame member 120 and a side support 80, for example by bolting and/or welding. The upper bracket 150 is intended to receive and secure the upper end of an air bag 170 and is the main support of a pillow block 200, which holds a swivel shaft 180 that hinges the lower air bag bracket 160 to the upper air bag bracket 150. The lower air bag bracket 160 is adapted to receive and secure the lower terminus, or end, of the air bag 170, thereby sandwiching the air bag 170 between the two brackets which hold it in position, to function both as a shock absorber, in the transport mode (FIG. 4), when a load is being moved from one point to another, and as a kind of "elevator" in the squatdown mode (FIG. 5), wherein the main frame of the vehicle is raised and lowered.

With particular reference to FIG. 4, the upper bracket 150 and lower bracket 160 are, in keeping with the invention, joined at their respective leading ends, 172 and 174, respectively. For purposes of this description, the term "leading" references the direction of forward movement of the vehicle 10.

The juncture of the brackets is such that the lower bracket 160 is rotatable, or swiveled, about the leading end 172 of the upper bracket 150. The desired relative motion is accomplished by means of a pillow block type bearing arrangement 200, affixed at the leading edge of the upper bracket 150, and the leading edge 172 is formed with a shaft receiving opening, not specifically shown, which is engaged, in bearing relation, by a swivel shaft 180, in the pillow block 200. A circular bearing 190 is secured in the pillow block. The lower air bag bracket 160 is attached to the swivel shaft 180 to extend rearwardly of the swivel shaft and substantially parallel to the side support 80 when viewed from above, as seen in FIG. 7.

As previously alluded to, the capacity of the present invention to squat down to a very low profile, and to present a "ramp" to the ground having a very low angle, makes any vehicle equipped with the modular system of the present invention extremely easy to load and unload from ground level, with a minimum effort, and without the aid of loading docks or power equipment. Moreover, such vehicles can receive and transport very low profile vehicles, whereas lack of clearance has previously been a significant deterrent.

In accomplishing these goals, it is necessary to be able to lower the trailing end of the truck bed to the ground at an exceptionally shallow angle. For example, a 15' long bed may be lowered to provide an angle α of 2.4° and an 18' bed as much as 2°, depending on the location of the modular units. Because, however, the vehicle must have a specific minimum road clearance in its transport mode, special problems arise. These problems are overcome, in accordance with the invention, by having the capacity to selectively lower the main frame 20 from its transport mode height to a position below the height of the spindle 220 upon which the wheels 230 of the opposed pairs of modular units 145 are mounted, as best seen in FIG. 5.

Figure 2:
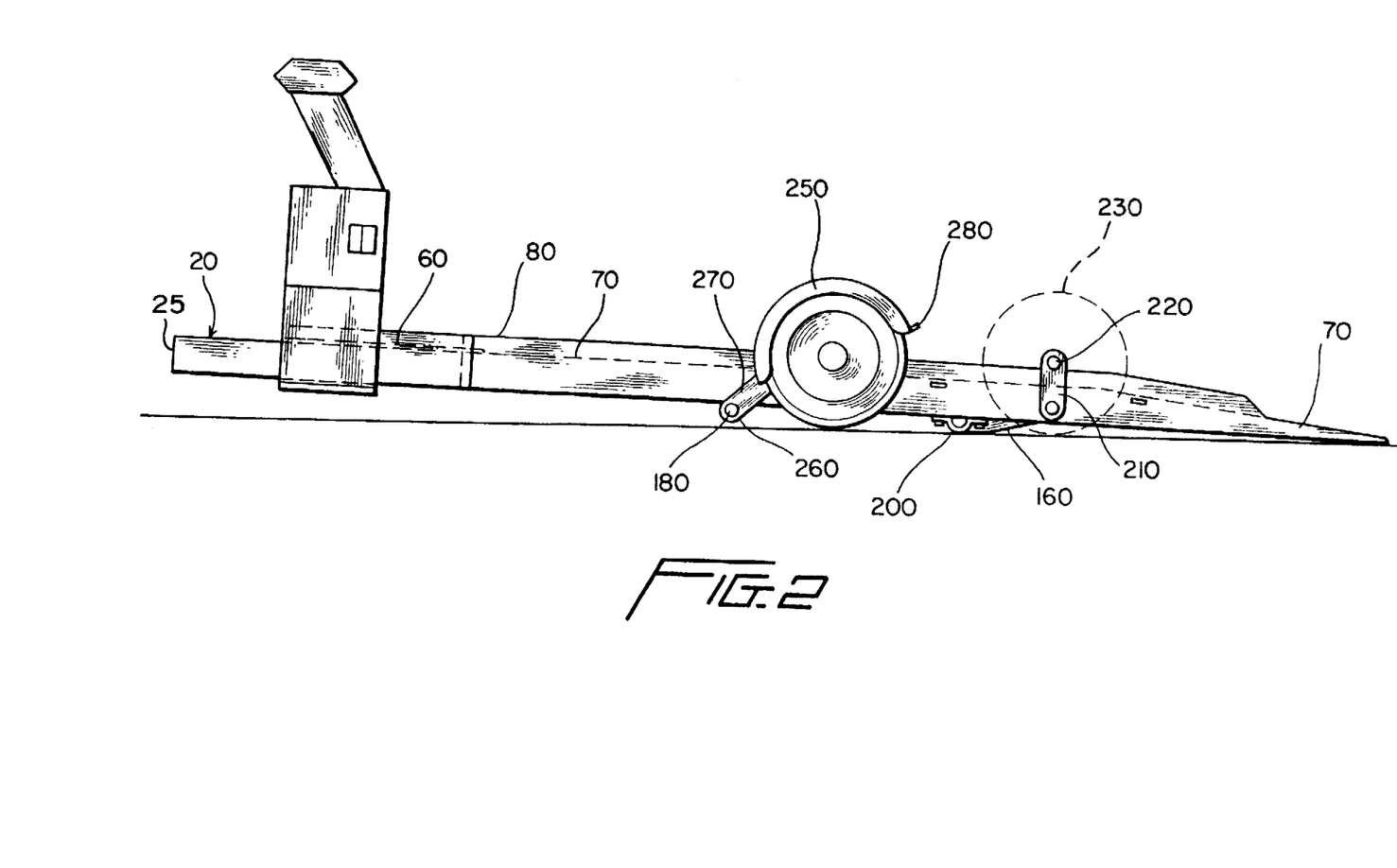
FIG. 2 is a pictorial view of the trailer of FIG. 1, shown in its "squatdown" or load and unload mode.

To accomplish proper lowering of the main frame 20 and the deck 70 each modular unit 145 employs an upright spindle arm, or link, 210. The link 210 is secured to the trailing end 222, of the lower bracket 160, in any well known manner, at its lower end 224, while its upper end 226 engages the spindle 220. As shown best in FIG. 7, the spindle arm 210 is attached on the outboard side and substantially parallel to side support 80. The spindle 220 is bolted outwardly of and on the spindle arm 210 with caster-camber-toe in-toe out adjustment shims in position. FIGS. 1 and 4 show the positions of spindle arm 210 and spindle 220 in the transport mode, while FIGS. 2 and 5 show the respective positions of the spindle arm 210 and spindle 220 in the squatdown mode.

In reference to FIG. 5, it will be seen that the link 210 controls the position of the lower bracket 160. The present invention, which includes an air compressor 320 and a reserve air tank 330 (FIG. 3), is constructed to permit the air bags of each modular unit to be inflated or deflated to a precise pressure for each particular task.

The squatdown suspension system of the present invention is preferably operated by a series of electrical switches and switch-actuated valves. The air in the air bags 170 can be released from the air bags by activating an electric switch 380 to a dump valve 350, which allows the main frame 20 to lower. The bed 70 lowers to ground level, pivoting from a pivot or swivel point 25 FIGS. 1, 2 and 8). If a longer bed length is required, the telescoping deck 70 can be extended by actuating the hydraulic cylinder 110 to power slides (not shown) on the telescoping subframe 130, thus telescoping the deck to the length required by the cargo. The wheelbase is extended or retracted in this manner. When the dump valve 350 is not electrically charged, a leveling valve 410 operates to maintain the proper air pressure in the air bags 170 and calibrated bed height. The heavier the load, the more air pressure is required to level the bed and maintain a soft ride. When the cargo is loaded on the bed or deck 70, the switch 380 is deactivated, and air is automatically reintroduced into the air bags 170. The frame 20 is raised to the calibrated bed height for transporting the cargo. The leveling valve 410 allows enough pressure into the air bags 170 as required to lift and carry the bed regardless of the net weight of the cargo, if there is enough pressure in the air compressor 320 or storage tank 340. It is possible to limit the vehicle's weight capacity by adjusting the air pressure regulator 390.

The frame 20 is held off the ground any time there is an involuntary loss of air, such as from damaged air lines or air bags or a leak in the air system, by a safety hold mechanism. The safety hold mechanism is operated by the exhausted air in the dump valve 350. The safety hold mechanism includes a movable autolock block or locking bracket 430 associated with the modular unit 145 and positioned under the deck 70, as shown in FIGS. 4 and 5. Exhaust air from the dump valve 350 (FIG. 3) activates an autohold valve 420 to move the autolock block 430 in a rearward direction any time a voluntary loss of air from the air bag 170 is activated by the dump valve switch 380 (FIG. 3) to lower the deck 70. Therefore, when an involuntary loss of air occurs, exhaust air from the dump valve 350 also activates the autohold valve 420 to prevent the bottom bracket from collapsing by moving the autolock block 430 rearwardly relative to the spindle 220. The autolock block 430 remains in place to maintain a ground clearance until repairs can be accomplished. The air pressure from the exhausting dump valve 350 moves a piston (not shown), which, in turn, mechanically moves a rod 425, which extends between the autohold valve 420 and the autolock block 430. In FIG. 4, the rod 425 is shown extending from the autohold valve 420 a sufficient distance to move the autolock block forwardly of the spindle 220 when the air bag 170 is inflated, and in FIG. 5 the rod 425 is retracted to pull the autolock block 430 rearwardly of the spindle 220 when the air bag 170 is deflated. The autolock mechanism (autolock block 430 and rod 425) is shown in the lock mode in FIG. 4.

FIG. 3 shows, schematically, the components of the air system of the present invention. The pressure regulator 390 regulates the air compressor 320 for operation as needed. Air is pumped into the reserve tank 330 to a specified pressure. Gauges 360, 370 monitor the pressure of the reserve tank 330 and the air bags 170. Switches 380 control the dump valve 350 and an autohold valve 420 (FIG. 4), as well as a hydraulic system (FIG. 3) and a winch (not shown). Also part of the air system shown in FIG. 3 are a nitrogen pressure gauge 375 and a nitrogen pressure regulator 395 for nitrogen bottles used for operation of the air system. The dump valve 350 is electrically charged to "dump" the air in the air bags 170, and the exhaust air activates the autohold valve 420 to move the autolock block 430 in a rearward direction any time a voluntary loss of air occurs. The autolock block 430 remains locked in place, as shown in FIG. 4, to maintain a ground clearance until repairs can be accomplished. As shown in FIG. 5, the autolock block 430 is out of the way to allow a complete lowering of the main frame 20.

When the dump valve 350 is not electrically charged, air is allowed to pass directly through the leveling valve 410 to the air bag 170. A sway bar 240 (FIG. 7), which is attached to the lower air bag bracket 160, acts as a sensing device for the leveling valve 410 to maintain a level bed height. When the dump valve 350 is electrically charged, air passage from the leveling valve 410 to the air bag 170 is blocked, allowing the reserve tank 330 to maintain some air pressure. Thus, when the dump valve 350 is charged, the frame 20 "squats" to a ground-engaging position. When not charged, the leveling valve 410 allows air pressure to raise the bed to the calibrated height for transport.

Accordingly, when the air bag is deflated, therefore, the lowering of the main frame 20 is accomplished to a position as therein shown, thereby creating a very soft slope which serves as a ramp for the loading and unloading of cargo. The ramp angle may also be altered somewhat by placement of modular units at various distances from the forward end of the bed, which, of course, remains at a height necessary for road clearance, whether it is attached to a motorized vehicle, or whether it is, itself, powered.

The ramp angle is further adjustable by providing the vehicle 10 with a telescoping bed. Thus, in reference to FIG. 3, the present invention contemplates the provision of a telescoping deck 70, which is extensible relative to the main frame, and whose movement is controlled by a hydraulic cylinder 110. In order to close any gap resulting from the extension of the telescoping deck 70, the sliding deck 60 slides into place in the gap. The telescoping bed or deck 70 operates independently of the air system described above. For example, the wheel base on a prototype of the present invention is adjustable from 134' to as much as 170', depending on the length required to carry the load safely. The load angle can be changed as the bed is extended and lowered, for example from 1¾ degrees at a 14½ foot bed length to 1½ degrees at a 17½ foot bed length. Even when the bed 70 is fully extended, 66% of the double frame shown in FIG. 6 is still together.

Sway bars 240 (FIGS. 3, 4 and 5) are attached to the lower air bag bracket 160 of modular units 145 on opposite sides of the vehicle to minimize port and starboard sway. The sway bar 240 is the sensing device for the leveling valve 410 to maintain a level bed height. When the dump valves 350 (FIG. 3) are not electrically charged, air is allowed to pass directly from the leveling valves 410 to the air bags 170. When the dump valves 350 are electrically charged, air passage from the leveling valves 410 to the air bags 170 is blocked, thus allowing the reserve tank 330 to maintain some air pressure. Thus, when the dump valves 350 are charged, the bed or deck 70 squats to a ground-engaging position, and when the dump valves 350 are not charged, the leveling valves 410 allow air pressure to raise the bed or deck 70 to the calibrated height.

In yet another aspect of the invention, and again referring to FIG. 7, fenders 250 (FIG. 3) are disposed above the wheels 230 of each modular wheel assembly, and are operable therewith to move through a limited arc with inflation and exhaustion of the air bags. Thus, a fender support arm 270 is affixed at one end to a fender swivel support 260, which rotates as the lower bracket 160 rotates. The fender 250 is attached to the other end of the arm 270, and moves between a position above the wheels in the transport mode, to a position on the wheels when the vehicle is in the squat mode. On the rearmost portion of the fender 250 (FIG. 2) is a fender horizontal support plate 280 that supports the rear portion of the fender 250 whenever the vehicle is in the loaded and transport mode of operation. This method of attachment is necessary because of the air bag suspension system 145. The attachment of the fender swivel support 260 and the fender swivel support 260 and the fender support arm 270 is shown in FIG. 7. The fenders 250 are hinged to the subframe 130, rather than an axle, to give an aesthetically pleasing look to the vehicle, as well as to provide a more secure attachment. The sonic vibrations of the tires puts excessive strain on fender brackets, rendering them useless. As the deck 70 is lowered to the ground, the fenders 250 come in contact with the top of the tire 230, and since both the fender and the tire are hinged from the same horizontal plane, they both rotate forward, as shown in FIG. 5.

Inflation and exhaustion of the air bags is designed to be remotely, or manually operable. By providing either a gas supply, such as nitrogen in a bottle, or an air compressor, both of which are schematically represented at 320, the entire operation of the vehicle can be accomplished from the truck cab, or by a wireless remote from any remote position. An auxiliary air line with a quick disconnect fitting may be installed for air tools and road service applications.

A cab protector 50 (FIG. 1), also referred to as the tool box, a steel cage behind the cab of the truck, is provided to help protect the cab in case of accident. It is also utilized as a tool box and a stanchion 40 for emergency lights 30. The cab protector or tool box is attached to the main frame 20 and is slotted on the sides for accepting side supports 80 when the deck 70 is in a retracted mode and has extending side support arms 85. These supports are more for an aesthetic look than for utilization.

The cab protector 50 is designed as a cage to give some protection to the towing vehicle in case of a rear-end collision, to prevent the cargo from causing damage in case of accident or panic stop, to allow space for an extra fuel tank, to provide tool storage, to provide cover for a winch (not shown), and to provide a base for the stanchion 40 which supports emergency vehicle lighting.

Body "molding" 290, 300, 310 (FIG. 3), not only gives the frame 20 and decks 60 and 70 a stocky, aesthetic look, but also makes room for tool boxes or storage areas for straps or chains used to secure loads.

The modular squatdown wheeled suspension system of the present invention can be used with many different sizes of vehicles, from the smallest trailer requiring a single wheel or axle to as many as space allows and net weight capacity requires, from the smallest front wheel drive vehicle to a class 14 truck. The weight capacity is restricted more by the tire size of the vehicle than the size of the air bags in each modular unit 145. The largest air bags that could be employed with the present invention can lift and carry 100,000 lbs. each.

In the pickup and delivery of the world's goods and services in class 3 to class 8 trucks which utilize the Squatdown Suspension System of the present invention, more goods can be transported with fewer trucks because the lower deck height increases the cubic footage in the cargo area. More weight can be carried by more axles, and the time used in loading or unloading is more efficient because the deck is lowered to ground level. This creates a safer working environment for the driver, not only in loading and unloading, but in the soft air ride offered by the suspension system. Safety is enhanced by the lower deck height for trucks and trailers, which lowers their center of gravity, reducing the "tip over" hazard and also reducing the "jack-knifing" type of accident. Even tanker trucks and trailers could utilize the lower frame specifications of the present invention. Mass transit buses could be outfitted with the present squatdown suspension system to assist the elderly and handicapped in getting in and out. Emergency vehicles, such as ambulances, could use the present system, not only for loading and unloading, but also for stability and the smooth ride of the air suspension. Route delivery vehicles could also use the present system. Livestock trucks and trailers using the present invention have a low loading angle and a wide gate that reduces the fear of the animals being loaded into a vehicle. The soft air ride reduces harmful effects in knee joints of race horses on long trips.

A conveyer belt floor can be provided on the deck 70 that has bracket slots (not shown) with a hood or finger design which attaches to special brackets on the pallets, vehicles, equipment or other cargo to be loaded. This conveyor squatdown system is similar to a fork lift in that as the pallet is approached, the bed is lowered to the point of contact and the hooks on the conveyer are inserted, so that when the conveyer is turned on, the hooks fit into slots on the pallet, which is picked up onto the conveyor belt. The conveyor squatdown system crawls underneath the pallet until the pallet is fully onto the conveyor belting, and the pallet is then pulled up onto the bed of the truck for better weight distribution and transporting. The conveyor squatdown system could have the bed in front of the vehicle cab so that the drive wheels and steering mechanism are at the rear of the bed. This would allow the driver more visibility in picking up and moving loads and would be similar to using a fork lift.

The universal squatdown system of the present invention is designed to carry shells or specialty types of beds, for example, a refrigerated box unit, a camper unit, a high-cube furniture unit, a car carrier, or a scissor-lift bed for dock-height loading and then ground-level unloading or vice versa.

Having described a preferred embodiment of the invention, and some variations on aspects thereof, what is claimed is:

1. A unitized wheel and suspension system for a wheeled cargo transport vehicle with a cargo support surface positioned at a desired transport mode height above ground level actuatable to move the cargo support surface from the desired transport mode height to a ground contacting load mode position to facilitate cargo loading and back to the transport mode height, said system comprising:
   (a) a pair of oppossed modular indepentent wheel air bag suspension systems independently mounted to a frame supporting the cargo support surface to move the cargo support surface between the transport mode height and the load mode position, each said system including an inflatable air bag sandwiched between an upper bracket secured to the frame and a lower bracket pivoted to the upper bracket and attached through a link assembly to a spindle mounting a wheel; and
   (b) an air system fluidically connected to each air bag selectively actuatable by a control system to provide a supply of air to said air bag to inflate said air bag to move the upper and lower brackets apart, thereby maintaining the cargo support surface at the transport mode height, or to remove air from each air bag to deflate said air bag to move said upper and lower brackets together so that the lower bracket contacts the ground, thereby lowering the cargo support surface to the ground contacting load mode position.

2. The unitized wheel and suspension system described in claim 1, further including a safety hold mechanism associated with each modular independent wheel air bag suspension system to prevent collapse of the lower bracket and to maintain the frame out of contact with the ground when the air bag involuntarily loses air, wherein said safety hold mechanism comprises an air actuated autohold valve operably connected between the air bag and a locking block, wherein said autohold valve is actuated by exhaust air from said air bag to move said locking block to a position which maintains the frame out of contact with the ground.

3. The unitized wheel and suspension system described in claim 1, wherein said air system includes a supply of compressed air and a reserve air tank, and said control system comprises an arrangement of selectively actuatable switches connected to valves positioned in fluid connection between each said air bag, said air supply and said reserve tank.

4. The unitized wheel and suspension system described in claim 3, wherein said arrangement of switches and valves includes an electrically activated dump valve that releases air from each said air bag in response to activation of an associated switch and a leveling valve that is activated by the deactivation of said dump valve associated switch to introduce air into each said air bag to a desired air pressure.

5. The unitized wheel and suspension system described in claim 1, wherein said frame supporting the cargo support surface comprises an arrangement of telescoping frame members extendible to change the wheel base of the vehicle and the load angle of the cargo support surface.

6. The unitized wheel and suspension system described in claim 1, wherein said lower bracket includes a first end rotatably attached through a bearing assembly to a leading edge of the upper bracket and a second end secured to the link assembly, wherein said link assembly includes a link element attached to the spindle.

7. A combined cargo loading and transport and suspension system for attachment to a vehicle body suitable for hauling selected cargo to be transported, wherein said system is movable between a ground contacting load mode and a raised cargo transport mode and provides a smooth, cushioned ride for the cargo on a cargo holding deck, said system comprising:
   (a) a frame supporting the cargo holding deck;
   (b) at least one pair of modular independent wheel air bag suspension systems mounted on opposite sides of said frame, wherein each one of said pair of modular independent wheel air bag suspension systems comprises:
      (i) a bracket assembly comprising an upper bracket element attached to said frame and a lower bracket element rotatably attached at a first end to a leading edge of said upper bracket element to be pivoted toward and away from said upper bracket element as said system is moved from a load mode to a transport mode;
      (ii) an inflatable air bag secured between said upper bracket element and said lower bracket element to cause the lower bracket element to pivot respectively toward and away from said upper bracket element as said air bag is selectively deflated and inflated; and (iii) a longitudinal link element secured between a second end of said lower bracket element and a spindle mounting a wheel and tire, wherein said link element is movable by said lower bracket element in response to the selective deflation and inflation of said air bag between said load mode, wherein said air bag is deflated, said lower bracket element moves toward said upper bracket element, and the cargo holding deck moves below the spindle so that said frame contacts the ground, and said transport mode, wherein said air bag is inflated, said lower bracket element is pivoted away from said upper bracket element, and the cargo holding deck is raised to a cargo transport height above the spindle; and (c) an air system fluidically connected to each said air bag and actuatable by a control system to selectively direct a supply of pressurized air into and out of said air bag to deflate or inflate said air bag as required to move said cargo holding deck to said load mode position or to said transport mode position.

8. The combined cargo loading and transport and suspension system described in claim 7, wherein said cargo holding deck has a substantially rectangular configuration with a short dimension and a long dimension and includes telescoping deck members operably connected to allow the long dimension of the deck to be extended to a desired length.

9. The combined cargo loading and transport and suspension system described in claim 7, wherein said system includes two pairs of modular independent wheel air bag suspension systems mounted on opposite sides of said frame.

10. The combined cargo loading and transport and suspension system described in claim 7, wherein said spindle is secured to said link element to facilitate caster-camber-toe in-toe out adjustment.

11. The combined cargo loading and transport and suspension system described in claim 7, wherein said air system further includes an air compressor, a reserve air tank, and a dump valve electrically activatable to deflate and inflate said air bags to move said cargo holding deck to a load mode position or to a transport mode position.

12. The combined cargo loading and transport and suspension system described in claim 1, wherein said air system further includes a leveling valve operatable independently of said dump valve to maintain desired air pressure in said air bags when said dump valve is not electrically charged.

13. The combined cargo loading and transport and suspension system described in claim 7, wherein said system further includes a safety hold mechanism to prevent said lower bracket element from collapsing and to maintain the frame out of contact with the ground in the event of involuntary deflation of said air bag when said cargo holding deck is in said transport mode position.

14. The combined cargo loading and transport and suspension system described in claim 7, wherein a cab protector structure is secured to said frame at an end of said cargo holding deck perpendicular to the deck.

15. The combined cargo loading and transport and suspension system described in claim 14, wherein said cab protector structure includes a support member for mounting emergency lights and emergency lights mounted on said support member.

16. A method for moving a cargo loading and transport deck supported by a frame mounted between at least one pair of wheels between a ground contacting load mode and a raised cargo transport mode to provide a smooth, cushioned ride for the cargo to be loaded and hauled, wherein said method comprises the steps of:

(a) actuating an air supply system fluidically connected to a modular independent wheel air bag suspension system associated with each wheel to inflate or deflate an inflatable air bag sandwiched between an upper bracket secured to the frame and a lower bracket pivoted to the upper bracket and attached through a link assembly to a spindle mounting the wheel by actuating a control system connected to said air supply system to selectively direct a supply of pressurized air into and out of each said air bag to deflate or inflate said air bag;

(b) first deflating each air bag to cause the lower bracket to pivot toward the upper bracket and the deck to be lowered to the load mode and then loading the cargo; and (c) after the cargo has been loaded, inflating each air bag to cause the lower bracket to pivot away from the upper bracket and the deck to be raised off the ground to the transport mode so that the cargo can be transported on the cargo holding deck.

* * * * *